July 16, 1968     F. HESTEN ET AL     3,393,062
APPARATUS FOR AND METHODS OF TOUGHENING GLASS ARTICLES
Filed Oct. 1, 1964
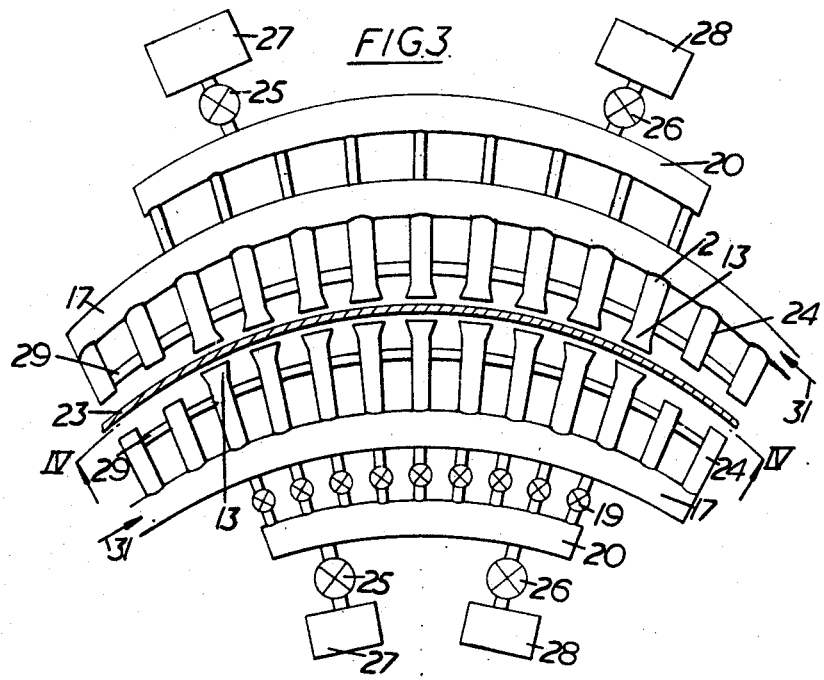
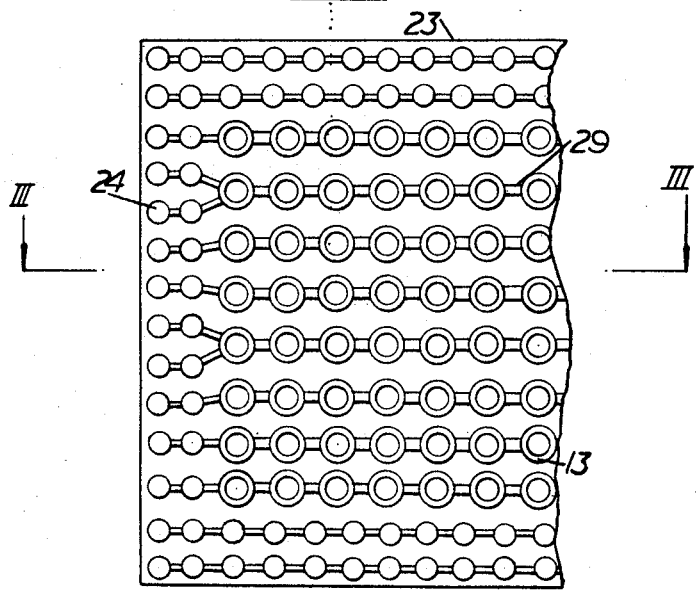

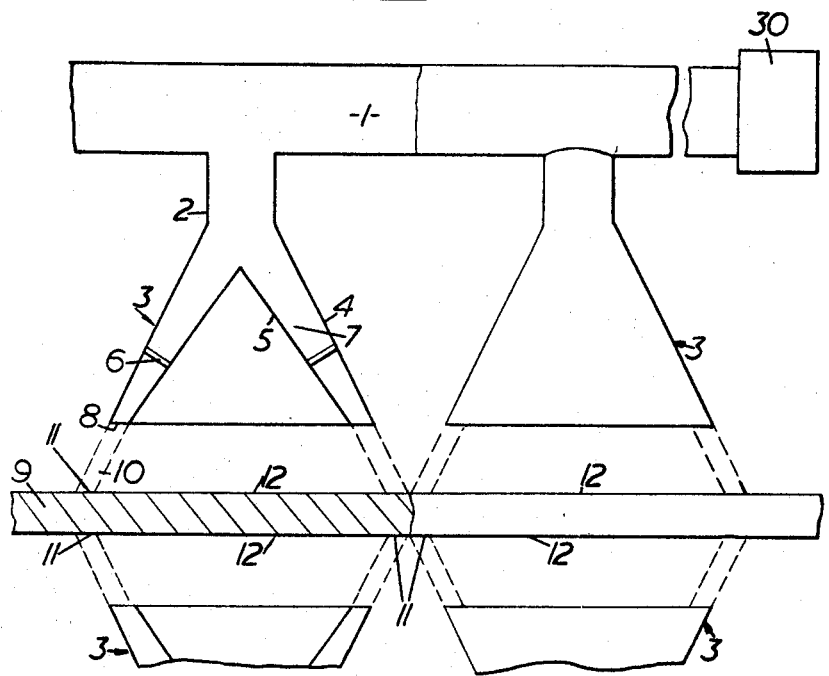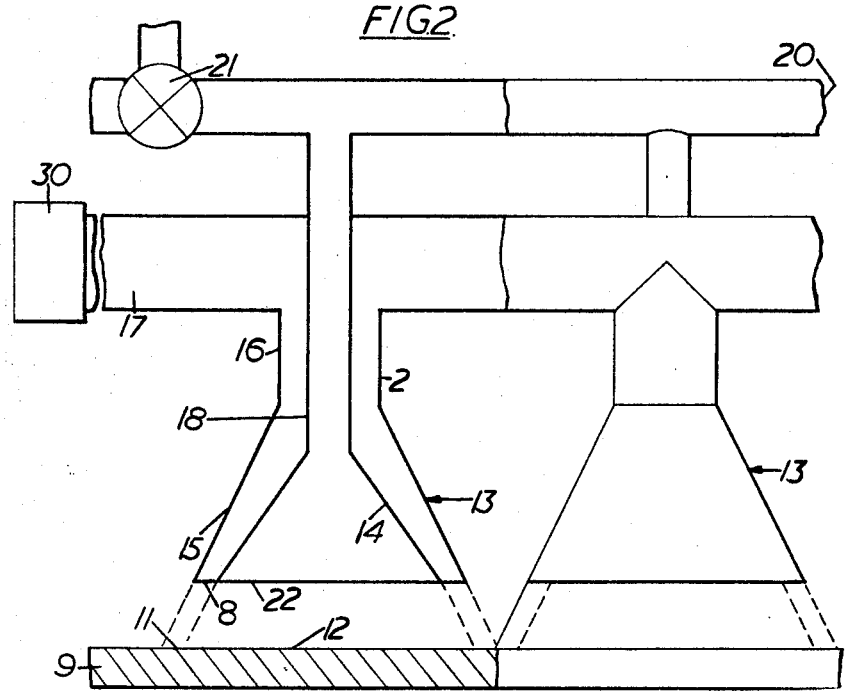

United States Patent Office 3,393,062
Patented July 16, 1968

3,393,062
APPARATUS FOR AND METHODS OF
TOUGHENING GLASS ARTICLES
Francis Hesten, Cheylesmore, Coventry, and Frederic William Newell, Kenilworth, England, assignors to Pilkington Brothers Limited, Liverpool, England, a corporation of Great Britain
Filed Oct. 1, 1964, Ser. No. 400,799
Claims priority, application Great Britain, Oct. 2, 1963, 38,879/63
9 Claims. (Cl. 65—115)

ABSTRACT OF THE DISCLOSURE

This invention relates to toughening glass articles by subjecting the heated glass to a plurality of jets of chilling air, and is particularly concerned with producing windscreens having a vision zone capable of fracturing into relatively large particles. In the invention the glass is subjected to diverging annular jets of chilling air produced from nozzles having inner and outer conical portions leading to an annular orifice, and means for and the step of connecting an aperture surrounded by the orifice either to a low pressure supply of chilling air, or to exhaust means.

This invention relates to apparatus for and methods of toughening glass articles and more particularly, but not exclusively, to apparatus for and methods of producing glass articles which have different degrees of toughening at different parts thereof.

Glass is toughened by subjecting the glass when at a temperature near the softening point of the glass to a rapid chilling effected by directing jets (termed "quenching jets") of a gaseous chilling medium, usually air, on to the glass. The degree of toughening achieved varies with the rate of chilling. The toughened glass comprises outer layers under compression which envelop glass in tension, hence the type of disintegration into small sections (termed "dicing") of toughened glass when the surface layer is fractured.

It is a main object of the present invention to provide improved apparatus for toughening a glass article.

According to the present invention there is provided apparatus for toughening a glass article comprising quenching means having a plurality of annular orifices associated with gas-impelling means for delivering a gaseous chilling medium against the surface of a heated glass article.

Conveniently means is provided for controlling the pressure of the gaseous chilling medium in the space surrounded by the said annular orifice.

Advantageously means is provided for delivering a gaseous chilling medium through an aperture within each said annular orifice at a pressure different from the pressure at which the gaseous chilling medium is delivered through the said annular orifice, and thereby differentially toughening the glass article.

In general the nozzles are arranged so that there is a space between the perimeters of the respective nozzles through which the chilling medium may move away from the glass article after it has carried out its chilling operation. Alternatively, however, an aperture within each said annular orifice may be connected to exhaust means for applying to said aperture during a quenching operation a pressure less than that built up over the area of the said aperture by the expended chilling medium from the said orifice during the quenching operation.

It will be understood that differential toughening of the glass article arises because the gaseous chilling medium issuing through the said annular orifice into contact with the heated glass article causes a different chilling effect from that obtained in the portions of the glass article opposite to the aperture contained within the annular orifice. A control of the difference in the degree of toughening between the parts of the glass article may be obtained by providing both delivery means for allowing a flow of a gaseous chilling medium through the aperture within the said annular orifice and exhaust means for applying to said aperture a pressure less than that created by the gaseous chilling medium flowing from the said orifice, together with connecting means for connecting the said aperture to either said delivery means or said exhaust means at different stages during the quenching operation. In this way the degree of toughening imparted to the portion of the glass article opposite to the said aperture is controlled and is conveniently less than the degree of toughening imparted to the portion of the glass article by the quenching jets issuing from the said annular orifice.

The present invention has particular application in apparatus for differentially toughening a glass sheet, for example a windscreen of an automobile. The basic requirements of a windscreen of toughened glass are that it shall be physically strong, substantially free from optical distortion and, when broken, shall exhibit a dicing type of fracture, while retaining a reasonable visibility through it.

According to this aspect, therefore, the present invention provides apparatus for differentially toughening a glass sheet comprising quenching means having pairs of opposed gas-emitting means each comprised by an annular orifice associated with gas-impelling means for delivering a gaseous chilling medium against the surface of the heated glass sheet.

The annular orifice may, for example, be circular, hexagonal, square or rectangular in shape. Preferably the gas-emitting means comprises projecting nozzles including inner and outer conical portions defining an annular passage leading to the annular orifice for the formation of a divergent annular jet when the gaseous chilling medium is impelled down the annular passage.

By a divergent annular jet, there is meant an annular jet of which the cross-sectional area within the annulus increases as the jet moves away from the annular orifice.

Advantageously the annular passage is convergent in the direction towards the annular orifice, that is to say the walls of the nozzle approach one another as the chilling medium moves down the nozzle towards the glass sheet. In general the arrangement of the convergent annular passage is such as to increase the velocity of the chilling medium as it moves down the passage.

One advantage of apparatus according to the present invention is that a differential stress pattern in a glass article and particularly a glass sheet may be obtained without oscillation of the apparatus. Furthermore the nozzles may be mounted in spaced relation on a skeleton framework which is capable of being made to conform to the surface of a curved glass sheet to be toughened while the individual nozzles mounted on the framework may be moved in order to ensure that the individual pairs of nozzles are directly opposite to one another on the respective frameworks when the curvature of the framework has been changed for toughening a glass sheet of another curvature.

According to this aspect therefore the present invention provides apparatus for toughening a curved glass sheet, for example a windscreen, the apparatus comprising opposed quenching frames, each comprising a skeleton framework, a plurality of nozzles mounted on said skeleton framework from which nozzles a chilling fluid may be directed against the surfaces of a heated glass sheet positioned therebetween, and supporting means for supporting a heated glass sheet in a position between said quenching frames, the nozzles on said opposed quenching frames being directly opposed to one another in pairs, the nozzles opposed to a central portion of the curved glass sheet each comprising inner and outer conical portions defining an annular passage leading to an annular orifice through which a gaseous chilling medium may be delivered against the central surface of the heated glass sheet to differentially toughen the central portion of said surface, and the nozzles opposed to a peripheral region of the curved glass sheet comprising apertures through which a gaseous chilling medium may be delivered against the peripheral surface of the curved glass sheet to toughen uniformly the said peripheral region of the curved glass sheet.

Desirably in said apparatus the annular passage is a convergent passage and the inner wall of the annular passage defines an aperture and there is provided means for selectively applying to said aperture either a pressure of a gaseous chilling medium different from the pressure at which the gaseous chilling medium is delivered through the said annular orifice or an exhaust pressure for withdrawing gas through said aperture, whereby the degree of toughening imparted to the portion of the glass sheet opposite to the said aperture is controlled and is less than the degree of toughening imparted to the portions of the glass sheet by the quenching jets issuing from the said annular orifices.

The selective application to the aperture of a pressure of gaseous chilling medium or an exhaust pressure may be achieved by the use of connecting means including valves for connecting to the aperture either a source of chilling medium or an exhaust means, or alternatively, in some cases, the chilling medium can be supplied by the pressure from a fan and the exhaust pressure applied by reversing the direction of operation of the fan.

Although the chilling medium composing the annular jet will be above atmospheric pressure, the ambient gas at the surface of the glass sheet may be at atmospheric pressure, and then, if no air is allowed to enter or leave the cone behind the central area forming the aperture within the said annular orifice, the pressure in the said central area may be above or below atmospheric pressure according to the velocity and the angle of divergence of the annular jets of chilling medium.

The present invention also comprehends a method of toughening a glass article comprising the step of exposing a heated glass article to the action of a gaseous chilling medium directed at the surface of the heated glass article in a plurality of divergent streams.

Preferably the divergent streams are joined together to form individual annular streams or jets, the various parts of which diverge from one another as they approach the glass article being toughened.

The present invention therefore further comprehends a method of producing a toughened glass article comprising the steps of exposing a heated glass article to the action of a gaseous chilling medium and directing the gaseous chilling medium at the surface of the heated glass article in the form of annular jets.

Moreover according to this aspect the present invention comprehends a method of producing a sheet of toughened glass comprising the steps of exposing a heated glass sheet to the action of a gaseous chilling medium and directing the gaseous chilling medium obliquely at a surface of the glass sheet in the form of annular jets.

As already indicated in the above discussion, the invention has particular application in the production of differentially toughened glass, for example for a windscreen of an automobile, and according to this aspect, the present invention provides a method of producing a sheet of differentially toughened glass having one or more selected areas intended to form one or more vision zones comprising the steps of exposing a heated glass sheet to the action of a gaseous chilling medium simultaneously directed to both faces of the glass sheet, the gaseous chilling medium being directed in the form of annular jets at the surfaces of the glass sheet in an area intended to form a vision zone, whereby there is formed in the toughened glass sheet an area having a stress pattern comprising closed rings which are toughened to a greater degree than the areas of the glass sheet within the said rings so that, when the sheet of glass is fractured, larger particles are formed in the areas of the glass within the said rings which are less toughened than the rings themselves and the said area persists as a vision zone.

The present invention further comprehends a glass article, for example a glass sheet, which has been toughened using apparatus or by a method in accordance with the present invention.

In order that the invention may be more clearly understood, the following detailed description of a preferred embodiment thereof is made by way of example with reference to the accompanying diagrammatic drawings in which:

FIGURE 1 is a sectional view of two nozzles for use in apparatus according to the invention, FIGURE 2 is a sectional view of another embodiment of nozzles in accordance with the present invention, FIGURE 3 is a plan view of apparatus according to the invention and including nozzles according to FIGURE 2, and FIGURE 4 is an elevation of part of the apparatus of FIGURE 3 taken along the line IV—IV.

In the drawings like reference numerals designate the same or similar parts.

Referring to FIGURE 1 of the drawings there is shown a manifold 1 on which are mounted individual tubes 2 each leading to a nozzle. The nozzle which is indicated generally at 3 comprises an outer conical portion 4 which is mounted directly on the tube 2 and an inner conical portion 5 which is secured by struts 6 to the outer conical member so that an annular passage is formed between the inner and outer conical portions. In the embodiment shown in FIGURE 1, the inner and outer conical portions have different conical angles, the conical angle of the inner conical portion 5 being larger than the angle of the outer conical portion 4 so that the annular passage 7 between the inner and outer conical portions is a convergent passage in a direction towards the annular orifice 8, which is defined by the base of the inner conical portion 5 within the outer conical portion 4.

A similar nozzle 3 is mounted on the opposite side of a heated glass sheet 9 so that the nozzles 3 of each pair are directly opposite to one another.

In operation air at ambient temperature is fed under pressure from a gas-impelling means, for example a source 30, into the manifold 1 and thence into each of the nozzles 3. The chilling air thus issues from each nozzle 3 in the form of an annular jet which is in fact a hollow conical stream 10 and the air in each part of the jet is directed obliquely at the surface of the glass sheet.

The included angle of the conical stream 10 is about 60° and the adjacent nozzles 3 are mounted so that a substantial distance between their nearest edges remains through which the air may evacuate itself after performing its chilling function on the surfaces of the glass sheet 9.

By the use of the nozzles 3 shown in FIGURE 1 a greater degree of quenching is obtained at the portions 11 of the surface of the glass sheet which are closed rings than in the portions of the glass sheet within said closed rings. The pressure of the chilling air may be varied to give a desired fracture pattern in and between the closed rings 11 but very little control is obtained of the fracture pattern produced in the portions of the glass 12 within the enclosed rings.

In the arrangement shown in FIGURE 1 the edges of the hollow conical streams 10 from adjacent nozzles 3 meet one another and consequently there will be no gaps between the individual closed rings 11 if the nozzles are triangular, square or rectangular in shape. In the event of circular, or elliptical nozzles 3 being employed, there will be areas of the surface of the sheet of glass 9 not enclosed by a ring 11 but between the rings 11 there will be considerable turbulence of the chilling air in those areas which will therefore be only slightly less toughened than the glass in the rings 11. Preferably, however, the shape of the nozzles is chosen, for example, to be triangular or square so that there are no gaps between the rings 11.

In a preferred embodiment of the invention illustrated in FIGURE 2, the nozzles 13 are provided with means for controlling the degree of toughening in the areas 12 of the surface of the glass within the closed rings 11.

The nozzle 13 is formed in similar manner to the nozzle 3 of FIGURE 1 with an inner conical portion 14 and an outer conical portion 15, the outer conical portion 15 being joined to a tube 16 and thence to a manifold 17, but the tube 16 is larger in diameter than the tube 2 of FIGURE 1 and a further tube 18 joining to the inner conical portion 14 runs substantially concentrically through the tube 2 to another manifold 20. The manifold 20 is connected through valve means 21 to sources (not shown) either of chilling air or of vacuum. In the first alternative, the source of chilling air can be the same source which supplies the manifold 17 but the pressure of the gaseous chilling medium supplied to the manifold 20 can be regulated by the valve means 21.

The adjacent nozzles 13 are similarly connected both to the manifold 17 and the manifold 20 so that chilling air at controlled pressures is supplied respectively to the annular orifice 8 and the aperture 22 within the said annular orifice. The degree of toughening of the areas 11 and 12 of the glass sheet 9 may thus both be controlled.

In FIGURE 3 of the drawings there is shown a plan view of apparatus employing nozzles 13 according to FIGURE 2 for toughening a curved glass sheet 23. From FIGURE 3 and also from FIGURE 4 it may be seen that the nozzles 13 are used to deliver chilling air against a central portion of the glass sheet whereas ordinary aperture nozzles 24 are used to direct chilling air at the peripheral or edge portions of the glass sheet 23.

In the arrangement of FIGURE 3 the manifold 20 is shown to be connected through separate valves 25 and 26 to a pump 27, which comprises a source of chilling air, and to an exhaust pump 28. The valves 25 and 26 are arranged so that when the heated glass sheet 23 is first placed between the quenching frames, the valve 25 is opened and chilling air is supplied to the apertures 22 within the annular orifices 8 of the nozzles 13. However, as the temperature of the glass sheet nears the strain point, the valve 25 is closed and the valve 26 opened so that instead of chilling air being supplied to the apertures 22 these apertures are used to exhaust heated air from the region of the glass sheet 23.

If the pressure in the central region opposite the aperture 22 is sub-atmospheric, the flow of air into tube 18 may be controlled by adjustment of valve 25 to connect the manifold 20 direct to the atmosphere rather than to the pump 27. In such a case a three-way valve would be used in place of the two-way valve 25 illustrated in FIGURE 3.

The quenching frames illustrated in FIGURE 3 are comprised by the nozzles 13 and 24 mounted on a skeleton framework 29 behind which are situated the manifolds 17 and 20. The supply of chilling air from an appropriate source to the manifolds 17 is indicated in FIGURE 3 by the arrows 31.

In the drawings the arrangement of jets from the nozzles is shown such that the supposedly parallel walled jets just touch where they impinge on the glass. Alternatively, with different spacing or different orientations of the jets there could be gaps between the jets when they strike the glass.

In the embodiments of the invention described and illustrated herein, the gas-emitting means have been shown as nozzles projecting beyond the main structure and towards the glass article or sheet which is being quenched. Equally, however, the gas-emitting means may comprise annular orifices in the flat face of a blowing box. In this alternative embodiment of the present invention, the actual gas-emitting means is a construction similar to that already described with reference to FIGURE 2, the annular orifices being formed in an outer plate of the blowing box and communicating with a chamber located within the blowing box and just below the outer plate. The inner walls of the annular orifices are formed by tubes which pass through the first chamber, which communicates with the orifice itself, to a second chamber located behind the first chamber. Appropriate sources of gas supply, or exhaust means if desired, are connected to the two chambers within the blowing box.

The practice of the present invention also includes the supply of chilling medium at different temperatures to the annular orifice and the central aperture to improve the differential toughening in the glass article.

By the use of the embodiments of the invention described, and particularly with reference to FIGURES 2 to 4, toughened curved glass sheets having a differential stress pattern similar to that described in our co-pending patent application No. 23,259/63 are obtained without any risk of the quality of the glass sheet being impaired by contact between the interposed members which mask the flow of the gaseous chilling medium over certain strip-like areas of the glass sheet as described and claimed in our aforesaid co-pending application.

Furthermore, apparatus according to the present invention and having exhaust means connected to an aperture within the annular orifice has the advantage that expended chilling medium may be readily evacuated from the neighbourhood of the glass article being toughened, so that the formation of a film of hot gas which prevents the cold gas from making contact with the article to be toughened may be substantially avoided.

We claim:
1. Apparatus for toughening a glass article, comprising quenching means having nozzles including inner and outer conical portions defining an annular passage which passage diverges in diameter towards an annular orifice for the formation of an annular divergent jet, gas impelling means for delivering a gaseous chilling medium through the said annular orifice and against the surface of a heated glass article, and a control device connected to the aperture surrounded by said annular orifice and defined by the inner conical portion for controlling the gas pressure present within said aperture during the toughening of a glass article, said control device comprising means for connecting said aperture to gas moving means for moving a gaseous medium through said aperture at a pressure less than the pressure at which gaseous chilling medium is delivered through said annular orifice.

2. Apparatus for toughening a glass article comprising quenching means having nozzles including inner and outer conical portions defining an annular passage which passage diverges in diameter towards an annular orifice for the formation of a divergent annular jet, said annular passage being convergent in radial width in the direction towards the annular orifice, gas impelling means for delivering a gaseous chilling medium through the said annular orifice and against the surface of a heated glass article, and a control device connected to the aperture surrounded by said annular orifice and defined by said inner conical portion for controlling the gas pressure present within said aperture during the toughening of a glass article, said control device comprising means for connecting said aperture to gas moving means for moving a gaseous medium through said aperture at a pressure less than the pressure at which gaseous chilling medium is delivered through said annular orifice, whereby a desired differential toughening of the glass article is obtained.

3. Apparatus according to claim 1, wherein said gas moving means are exhaust means for applying to the said aperture during a quenching operation a pressure less than that built up over the area of said aperture by the expended chilling medium during the quenching operation.

4. Apparatus for toughening a glass article comprising quenching means having nozzles including inner and outer conical portions defining an annular passage which passage diverges in diameter towards an annular orifice for the formation of a divergent annular jet, said annular passage being convergent in radial width in the direction towards the annular orifice, gas impelling means for delivering a gaseous chilling medium through the said annular orifice and against the surface of a heated glass article, and a control device connected to the aperture surrounded by said annular orifice and defined by said inner conical portion for controlling the gas pressure present within said aperture during the toughening of a glass article, whereby a desired differential toughening of the glass article is obtained, wherein the control device comprises means for selectively connecting said aperture to gas delivery means for delivering a gaseous chilling medium through the said aperture at a pressure less than the pressure at which the gaseous chilling medium is delivered through the said annular orifice at one period and to exhaust means for applying to said aperture a pressure less than that created by the gaseous chilling medium flowing from the said orifice at another period.

5. Apparatus for toughening a curved glass sheet for example a windscreen, the apparatus comprising opposed quenching frames, each comprising a skeleton framework, a plurality of nozzles mounted on said skeleton framework from which nozzles a chilling fluid may be directed against the surface of a heated glass sheet positioned therebetween and supporting means for supporting a heated glass sheet in a position between said quenching frames, the nozzles on said quenching frames being directly opposed to one another in pairs, the nozzles opposed to a central portion of the curved glass sheet each comprising inner and outer conical portions defining an annular passage which passage diverges in diameter towards an annular orifice, said annular passage being convergent in radial width in the direction towards the annular orifice, gas impelling means for delivering a gaseous chilling medium through said annular orifice and against the surface of the heated glass sheet to differentially toughen said central portion of said surface, and a control device connected to the aperture surrounded by said annular orifice and defined by said inner conical portion for controlling the gas pressure present within said aperture during the toughening of the glass sheet, said control device comprising means for selectively connecting said aperture to gas delivery means for delivering a gaseous chilling medium through the said aperture at a pressure less than the pressure at which the gaseous chilling medium is delivered through said annular orifice at one period and to exhaust meanst for appling to said aperture a pressure less than that built up against the glass sheet by the chilling medium delivered from the annular orifice, whereby a control of said differential toughening of said central portion is achieved, and the nozzles opposed to a peripheral region of the curved glass sheet comprising apertures through which a gaseous chilling medium may be delivered against the peripheral surface of the curved glass sheet to toughen uniformly the said peripheral regions of the glass sheet.

6. In apparatus for toughening a glass article, quenching means comprising nozzles each having a diverging external annular nozzle portion with a circular nozzle portion formed within the area described by the inner wall of the annular nozzle and means for separately supplying each of said nozzle portions.

7. A method of producing a toughened glass sheet comprising the steps of exposing the sheet of glass heated to near the softening point of the glass to the action of a gaseous chilling medium, directing the gaseous chilling medium at its surface in the form of annular jets, and engendering a flow of gaseous medium, having a total heat substantially different from the total heat of the flow of said gaseous chilling medium until a stress pattern is se up in the glass, through the space surrounded by the annular jets as they impinge over the said surface, whereby there is formed an outer annular zone having a different stress pattern from an inner annular zone.

8. A method of producing a sheet of differentially toughened glass having one or more selected areas intended to form one or more vision zones comprising the steps of exposing a glass sheet heated to near the softening point of the glass to the action of a gaseous chilling medium simultaneously directed to both faces of the glass sheet, the gaseous chilling medium being directed in the form of divergent annular streams at the surfaces of the glass sheet in an area intended to form a vision zone, and engendering a gaseous flow, having a total heat substantially different from the total heat in the flow of said gaseous chilling medium, through the area surrounded by the divergent annular streams as they impinge on the surface of the heated glass sheet until a stress pattern is set up in the glass, whereby there is formed in the toughened glass sheet an area having a stress pattern comprising closed rings which are toughened to a greater degree than the areas of the glass sheet within the said rings so that, when the sheet of glass is fractured, larger particles are formed in the areas of the glass within the said rings which are less toughened than the rings themselves and the said area persists as a vision zone 9. A method according to claim 8, characterized in that the desired degree of differential toughening is obtained in a selected zone of the glass sheet and that the remainder of the glass sheet is uniformly toughened in conventional manner, whereby there is formed a toughened glass sheet having in the selected zone a stress pattern comprising closed rings which are toughened to a greater degree than the area of the glass sheet within the said rings, so that when the sheet of glass is fractured larger particles are formed in the area of the glass within the said rings which are less toughened than the rings themselves and the said zone persists as a vision zone.

References Cited

UNITED STATES PATENTS

| | | | |
|---|---|---|---|
| 2,298,709 | 10/1942 | Long | 65—348 |
| 3,293,015 | 12/1966 | Fredley et al. | 65—25 |

S. LEON BASHORE, *Acting Primary Examiner.*

DONALL H. SYLVESTER, *Examiner.*

A. D. KELLOGG, *Assistant Examiner.*